June 12, 1923. Re. 15,625

C. H. TAYLOR

THREAD CUTTER

Original Filed March 9, 1916 2 Sheets-Sheet 1

Inventor
C. H. Taylor
By S. Jay Teller
Attorney.

June 12, 1923. Re. 15,625

C. H. TAYLOR

THREAD CUTTER

Original Filed March 9, 1916 2 Sheets-Sheet 2

Inventor
C. H. Taylor.
By S. Jay Teller
Attorney.

Reissued June 12, 1923. Re. 15,625

UNITED STATES PATENT OFFICE.

CHARLES H. TAYLOR, OF TORONTO, ONTARIO, CANADA, ASSIGNOR TO PRATT & WHITNEY COMPANY, OF NEW YORK, N. Y., A CORPORATION OF NEW JERSEY.

THREAD CUTTER.

Original No. 1,276,445, dated August 20, 1918, Serial No. 83,104, filed March 9, 1916. Application for reissue filed February 12, 1920. Serial No. 358,123.

*To all whom it may concern:*

Be it known that I, CHARLES HAVELOCK TAYLOR, of the city of Toronto, Province of Ontario, Dominion of Canada, have invented certain new and useful Improvements in Thread Cutters, and the following is a full, clear, and exact description of the same.

My invention relates particularly to automatic machines and has for its object to provide an attachment for machines of this type whereby a thread may be cut either even with the perimeter of the work or behind a shoulder, a feature of the invention being that the thread may be cut before the piece is separated from the stock and the thread commences immediately at the face of the shoulder. Another feature of the invention is that a thread may be cut on a reduced diameter between the ends of the bar either to receive a split nut or be subsequently divided and form the screw threaded ends of separate pieces.

More fully stated the primary object of my invention is to provide an improved milling thread cutter which will operate to cut a thread on a blank without longitudinal movement of the cutter relative to the blank and which will prevent the formations of facets on the thread being cut and leave a perfectly smooth and accurately formed thread.

Further, it is an object of the invention to provide means to rotate the cutter while in operative position and to stop its rotation when in inoperative position.

Broadly stated, my invention consists of a unitary rotary tool of circular form with its perimeter divided into a plurality of threads, each thread being divided into a plurality of cutting teeth. The number of these cutting threads in the embodiment illustrated is not an aliquot or commensurate part of the number of cutting teeth in each thread. The threads are spaced uniformly around the surface of the tool and are similar in cross section to the threads desired to be cut. The tool is, as before mentioned, rotary, and it is combined with a chuck, or other stock-holding means also having rotation imparted to it, and the relative speed of the cutter and the stock or bar is an important factor. The stock must be driven at as many times greater speed than the tool as there are threads on the tool, the effect being that one continuous thread is cut on the stock equal in length to the width of the tool and possessing a lead equal to a fraction the thread of the tool is of its lead.

I have illustrated and will describe my invention applied to an automatic machine having a collet for holding the stock and feeding mechanism by which the stock is intermittently fed through the collet, and a pair of alternating cross slides carrying respectively my improved cutting tool and a cutter for separating the finished piece from the stock.

For full comprehension, however, of my invention, reference must be had to the accompanying drawings in which similar reference characters indicate the same parts, and wherein.

The frame of the automatic machine to which my invention is applied is indicated at 2, having cross slides at 3 and 4, the collet at 5, the cams for operating the slides at 6 and 7, and the levers effecting the operative connection between the cams and slides at 9, 10 and 11.

My improved thread cutter has a milling action and is incorporated in an attachment mounted upon slide 3, and the cutter by which the finished piece is separated from the stock is carried by an attachment 16 mounted rigidly on the slide 4.

In the present application of my invention, my screw thread milling cutter consists of an annular member 20, although for other requirements the particular form may be changed, the milling face or perimeter of the cutter being the essential feature.

Figure 1:
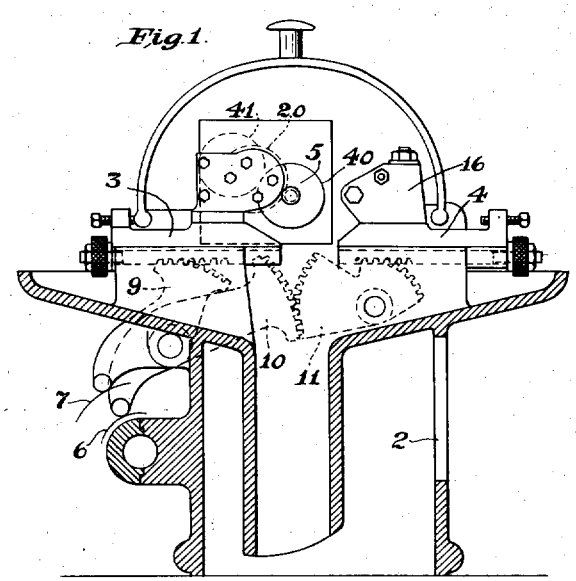
Figure 1 is a transverse sectional view of a machine of the type mentioned and equipped with my invention.
Figure 2:
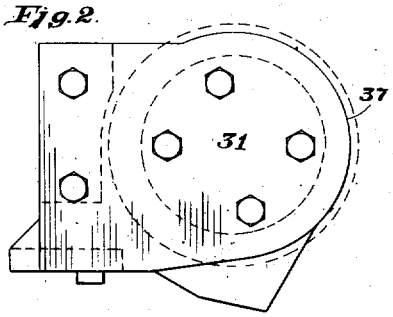
Figs. 2 and 3 are side elevations of my improved cutter removed.
Figure 3:
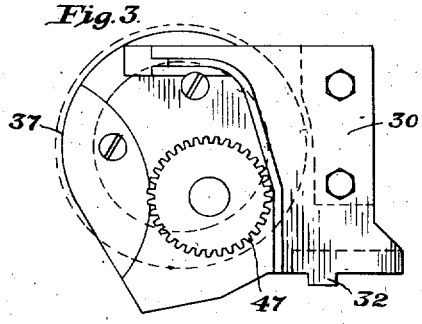
Figure 4:
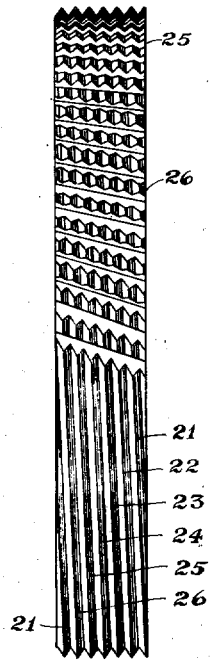
Figs. 4 and 5 are detail views of the thread milling cutter removed and drawn to a larger scale, the cutter being illustrated in process of manufacture with the threads formed on the perimeter and partially toothed.
Figure 5:
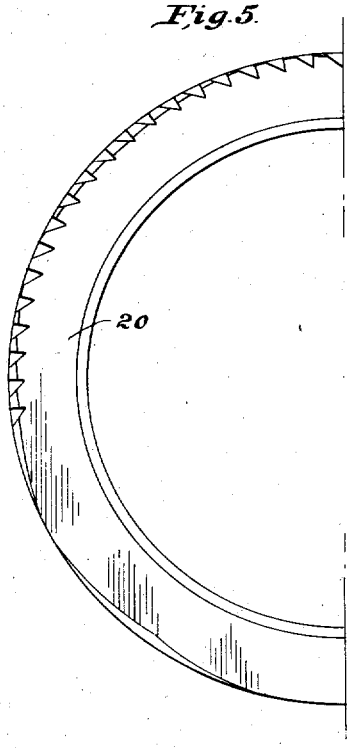
Figure 6:
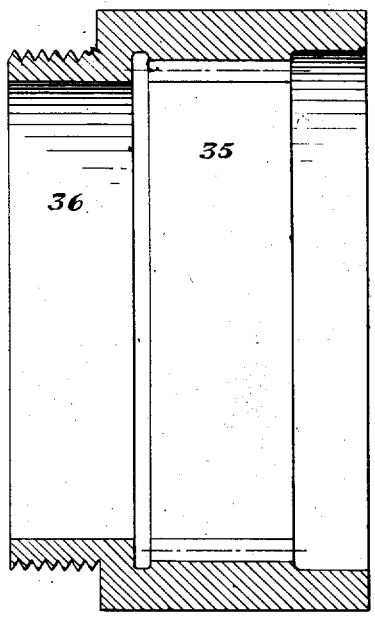
Fig. 6 is a sectional view of the annular member upon which the cutter is mounted.
Figure 7:
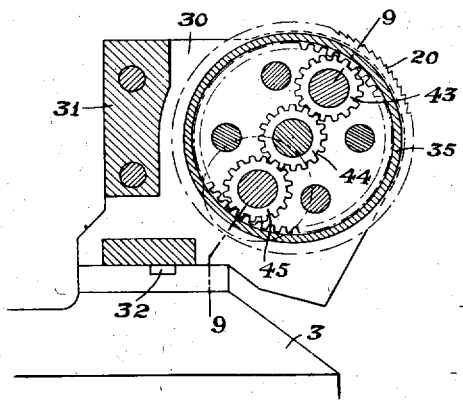
Fig. 7 is an elevation of a portion of a lathe for carrying my improved attachment and illustrating the attachment in vertical section.
Figure 11:
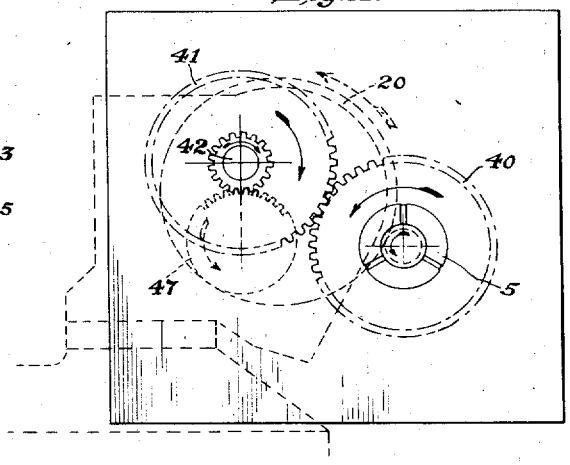
Fig. 11 is a detail end elevation of the head and driving mechanism for the attachments.
Figure 8:
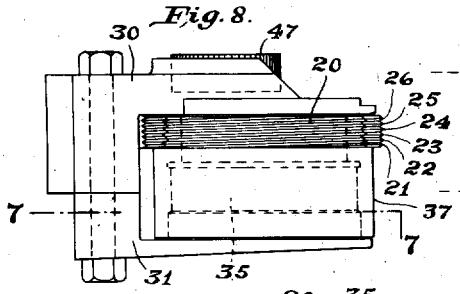
Fig. 8 is a plan view of the attachment.
Figure 8:
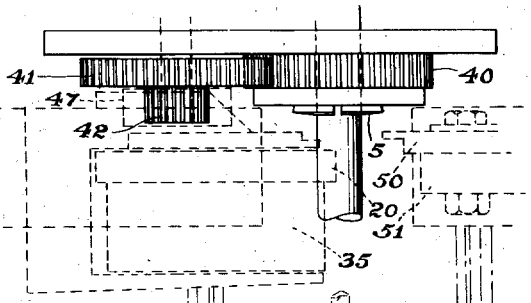
Figure 9:
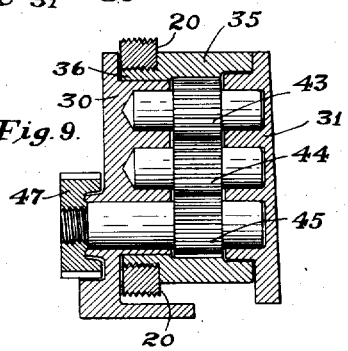
Fig. 9 is a diagonal sectional view taken on line 9—9 of Fig. 7.
Figure 12:
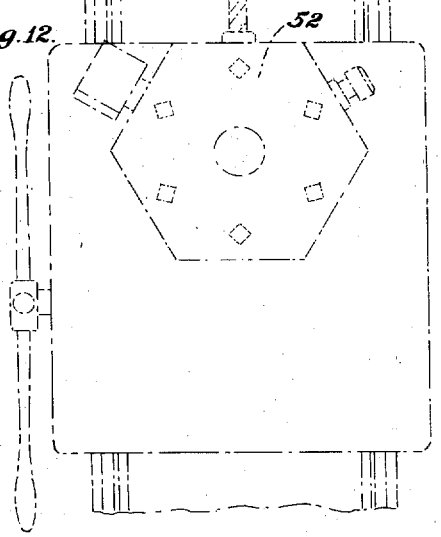
Fig. 12 is a plan view of the attachment shown in place in a lathe.
Figure 10:
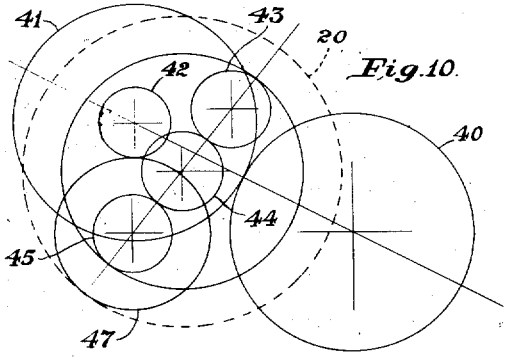
Fig. 10 is a diagram of the gears for obtaining the required relative milling speeds of the cutter and stock.

This milling face or perimeter is cut to present six independent and separate threads 21, 22, 23, 24, 25 and 26 respectively, each thread being cut to present a plurality of teeth as illustrated in Fig. 4. These threads commence at one end or side of the cutter at intervals of $\frac{1}{6}$ the circumference and extend parallel around the cutter, finishing at the other end or side. They have corresponding leads and each lead is approximately the axial length of the milling face.

The number of independent threads on the cutter may be varied. It is, however, essential to the present invention that the threads have multiple starts, that is, that a plurality of separate helices, be provided on the thread cutting surface. The multiple starts or individual helices are uniformly spaced about the periphery of the cutter and preferably have a form and size conforming to the thread desired to be cut.

The lead of these cutter threads or helices is increased to a multiple of the lead of the thread desired to be cut, and so increased that it will preferably correspond to the number of starts or helices provided on the cutter. In other words, if the number of starts chosen for the cutter is 6, as in the present illustrated form of the invention, the lead of the threads on the cutter would be increased six times as compared with the lead desired to be cut. If, however, the number of helices on the cutter is four, the lead would preferably be increased but four times compared to the lead of the thread to be cut.

In order to present an oblique arrangement of teeth across the face of the cutter, I cut the periphery of the cutter by means of oblique or helical gashes as shown in Fig. 4, thus providing the preferred form of cutting edge on the cutter, the number of gashes corresponding to the number of cutting edges.

In order to obtain all of the benefits of the present invention, the number of threads or starts on the cutter should be aliquant or incommensurate with the number of teeth on the cutter. I have shown, in the embodiment of the invention illustrated and described, the cutter 20 provided with 71 teeth, but any other number of teeth may be provided so long as the multiple of the threads on the cutter is an aliquant part of the number of teeth. The function of this incommensurate ratio between the number of threads and number of teeth is primarily to prevent the formation of facets or irregularities in the thread being cut. This function is accomplished for the reason that so long as this incommensurate ratio is maintained the teeth in each of the independent threads of the cutter will engage slightly different points in the circumference of the blank being threaded. The rotation of the blank and cutter are commensurate with relation to each other while the number of teeth engaged by one rotation of the cutter is incommensurate. The entire periphery of the blank is engaged while the cutter rotates through a portion of a revolution, the portion of the cutter engaged being dependent upon the multiple starts and multiplied lead of cutter threads. As the successive teeth on the different helices are spaced an incommensurate part of a circumference, the successive portions of the cutter will have their teeth so spaced that the blank will be engaged at slightly differing points in its circumference. In the embodiment of the invention shown the teeth of each portion of the cutter will be incommensurately related to those of the preceding portion so that the engagement of the different teeth of the cutter on the blank will be progressively different in each portion of the cutter.

In order to obtain the correct relative speeds of the stock and the milling cutter, I have designed a special attachment including the necessary gears and carrying the annular member 20 which has the milling face above described cut upon its perimeter and I will now describe this attachment. It consists of a pair of frames 30 and 31 which are left and right halves of the attachment respectively. The left half of the frame has a rib 32 which engages a corresponding groove in the cross slide 3 to which it is fastened by bolts or by screws. The right half 31, is bolted to and carried by the left half and between them is mounted an internal gear 35, one end of which is of reduced diameter 36 and cut on its outside with a left hand thread. This end of the internal gear has screwed thereon the annular milling cutter, the cutting face of which protrudes from the forward face 37 of the attachment. This internal gear is driven from a chuck or main driving gear 40 of the machine, which gear is driven in the direction indicated and drives a pinion 41 on the shaft of which a second pinion 42 is also rigidly mounted. This latter pinion 42 is the driven element with which the driving gear of the attachment comes into operative engagement when the cross slide 3 is moved to an operating position.

The gears of the attachment consist of the internal gear 35 and a train of gears 43, 44 and 45, the latter being mounted rigidly upon a shaft upon which is also rigidly mounted a gear 47 adapted to come into mesh with gear 42 when the slide 3 is shifted to operating position. This system of gearing is adapted to impart to the milling cutter a speed of one revolution to six revolutions of the stock.

In other words, while the stock rotates once, the milling cutter rotates $\frac{1}{6}$ of a revolution. This ratio is necessary in the embodiment of the invention described for the reason that the lead of the threads is increased six times relative to the work and the number of starts of the threads on the cutter is also six. This ratio must, however, be changed dependent upon the multiple of the starts on the cutter and their lead. As it is an important factor that these relative speeds be obtained, I will describe the gears specifically in tabulated form:

| Gear. | Teeth. | Pitch. |
|---|---|---|
| 40–41 | 73 | 20 |
| 42 | 21 | 20 |
| 47 | 42 | 20 |
| 45 | 16 | 14 |
| 35 | 48 | 14 |

As this invention relates only to the milling of screw threads and rotation of the stock in coaction with the milling operation, and as the means for advancing the stock after each milling and severing operation may be any of the well known types of stock feeding devices, I have neither described nor illustrated the latter, but it will be understood nevertheless that the stock is advanced as required after each threading and severing operation. The finished piece is severed from the stock by a cutting tool 50 mounted in the carrier 51 fastened rigidly to the slide 4.

Other tools may be mounted on the automatic or other machine upon which the present invention may be provided as an attachment. These tools may be preferably held as usual in a turret 52 or other mounting whereby the piece being screw threaded by my milling cutter may be also operated upon in any of the usual ways, the milling operation taking place at any convenient time during the fashioning of the piece.

It will be obvious from the above that my thread milling attachment requires no longitudinal movement, that is, no movement parallel to the axis of the blank being threaded; also it will be understood that the present milling operation may take place at any point in the length of the blank being operated on, either at its outer free end or at the end adjacent the point of severing from the stock, and that the intermediate portions of the blank may be of larger or smaller diameters, the method of milling by the present invention permitting a screw thread to be milled at any part of the blank.

*Operation.*

During the milling operation the toothed cutter and stock rotate in the same direction and their contacting faces rotate in opposite directions, and as the stock makes six revolutions to one of the toothed cutter, a continuous screw thread is cut in the perimeter of the stock having a lead one sixth the lead of the cutter and equal in length to the axial length of the face of the cutter.

In order to produce a double, triple or quadruple thread, the driving gears should be changed to rotate the cutter $\frac{1}{3}$, $\frac{1}{2}$ or $\frac{2}{3}$ the number of revolutions of the stock.

The greater number of teeth on the cutter with proportionately less number of revolutions of the cutter, the more perfect the edge of the threads milled, and the fewer the number, the rougher the edge, while the number of threads govern the speed of both the cutter and stock which may be varied to give the proper cutting speed.

In cutting threads by the above described method, it is essential that the circumference of the blank being threaded should be touched by as many teeth in the cutter as possible and at slightly different positions in the circumference, otherwise irregularities such as facets will be formed. It is possible, and well known, to mill screw threads with a cutter having a single thread conforming to the shape and size desired to be cut and rotated at the same annular velocity as the blank. This, however, has the disadvantage of requiring a high rotative speed of the cutter. It is, therefore, found desirable to reduce the rotative speed of the cutter and this is accomplished by providing a plurality of threads on the cutter, that is, instead of a single thread being used on the cutter a double, triple or other multiple start thread is used. When this is done the angular speed is reduced in proportion to the number of starts or independent threads on the cutter. If, however, the periphery of the cutter is formed into a number of cutting teeth which is a multiple of the number of starts, it will be evident that the different arcs in the periphery of the cutter will engage precisely the same points in the circumference of the blank, which points on the blank would be slightly separated from each other and would thus form facets. To avoid this formation of facets and irregularities, I cut the threaded periphery of the cutter into a number of teeth incommensurate with the number of starts or the lead of the cutter threads, that is, the multiple of the lead of the cutter threads relative to the lead of the threads to be cut is an aliquant part of the number of teeth in the cutter. Then, as each portion of the cutter comes into contact with the blank, the teeth in the different portions of the cutter will engage points in the blank at slightly different points. Looked at in another way, by dividing the circumference of the cutter into this incommensurate number of teeth, which may in some instances be a prime number, the teeth of one continuous helix are spaced a number of teeth plus a fraction from the teeth of the successive helices, thus as each individual helix operates upon the blank from one face to the other of the cutter, successive helices cut at slightly differing points in the blank.

From the foregoing it will be seen that my improved milling cutter performs its function without axial movement of either the cutter or the stock, and the multiple quality of the cutter may be increased or diminished without departing from the spirit of my invention.

What I claim is:

1. In a milling screw-cutting attachment for an automatic screw machine a frame adapted to be incorporated in the machine, an internal gear mounted in the frame, an annular cutting member mounted upon said gear, and means for driving the gear.

2. A milling screw-cutter having an even number of toothed helical threads and each thread having an odd number of teeth.

3. A milling screw-cutter having an even number of toothed helical threads uniformly spaced around the periphery of the cutter and each thread having an odd number of teeth.

4. A milling screw-cutter having toothed helical multiple threads uniformly spaced around the periphery of the cutter, the threads having corresponding number of teeth and the number of threads being an aliquant part of the number of teeth of each thread.

5. The combination with a screw-cutting machine frame and a rotary stock-holding collet, of a milling screw-cutter having toothed helical multiple threads uniformly spaced around the periphery of the cutter, the threads having corresponding number of teeth and the number of threads being an aliquant part of the number of teeth of each thread, and means rotatively connecting the collect and cutter whereby the latter is rotated a fraction of the revolutions of the collet equal to number of threads into which the lead of the cutter is divided.

6. A milling screw-cutting attachment for an automatic screw machine, comprising a frame adapted to be incorporated in the machine, a gear rotatably mounted in the frame; an annular member rigidly mounted upon the gear and having toothed multiple threads and the number of threads being an aliquant part of the number of teeth of each thread; a driving gear rotatably mounted in the frame; and a train of gears rotatively connecting the driving gear to the internal gear.

7. A milling screw-cutting attachment for an automatic screw machine, comprising a frame adapted to be incorporated in the machine, a gear rotatably mounted in the frame; a helical milling screw-cutting member rigidly mounted upon the gear; a driving gear rotatably mounted in the frame; and a train of gears rotatively connecting the driving gear to the first mentioned gear.

8. In a screw-cutting machine a milling screw-cutter, means for rotating said cutter, and a continuously rotating mechanism for driving said means, such means being normally in operative engagement with said mechanism and adapted to be moved out of engagement therewith.

9. In a screw-cutting machine, the combination with a rotary stock carrier and a slide, of a milling screw-cutting attachment comprising a frame mounted upon the slide; an annular member rotatably mounted upon said frame, the perimeter of said member having uniformly circumferentially spaced toothed multiple peripheral threads, means for rotating said annular member, said means including an internal gear, and gears adapted to impart rotation to the internal gear when the slide is shifted.

10. In a screw-cutting machine, the combination with a rotary stock carrier, a tool-driving gear in rotative relation therewith, and a pair of cross-slides with means for reciprocating the same, of a milling screw-cutting attachment comprising a frame, means fastening the frame to one of the cross-slides; a cylindrical member rotatably bearing within the frame and having internal gear teeth; an annular member mounted rigidly upon one end of the cylindrical member with a portion of its outer perimeter protruding beyond the frame, and the said perimeter having uniformly circumferentially spaced toothed multiple peripheral threads; a driven gear rotatably mounted within the frame and arranged to engage the said tool-driving gear when the slide is shifted in one direction; and a train of gears rotatively connecting the driven gear to the internal gear.

11. In a screw-cutting machine, the combination with a rotary stock-carrier, a tool-driving gear in rotative relation therewith, and a pair of cross-slides with means for reciprocating the same, of a milling screw-cutting attachment comprising a frame, means fastening the frame to one of the cross-slides; a cylindrical member rotatably bearing within the frame and having internal gear teeth; an annular member mounted rigidly upon one end of the cylindrical member with a portion of its outer perimeter protruding beyond the frame and the said perimeter having uniformly circumferentially spaced toothed multiple peripheral threads; a driven gear rotatably mounted within the frame and arranged to engage the said tool-driving gear when the slide is shifted in one direction; a train of gears rotatively connecting the driven gear to the internal gear; and a cutting tool mounted on the other slide and arranged to sever.

12. A screw thread milling cutter having on one of its surfaces multiple start threads conforming to the shape of thread desired to be cut, each of said threads being interrupted to form a number of cutting edges, the cutting edges so formed in each thread engaging different points in the threads being cut.

13. A screw thread milling cutter having on one of its surfaces multiple start threads conforming to the shape of thread desired to be cut, each of said threads being interrupted to form a number of cutting edges, the cutting edges so formed in each thread engaging progressively different points in the threads being cut.

14. A screw thread milling cutter having multiple start threads uniformly spaced around its periphery, each thread being divided into a number of cutting teeth whereby the teeth on the different circumferential portions of the cutter will contact with different points in the periphery of the threads being cut.

15. A screw thread milling cutter having uniformly spaced on one of its surfaces multiple start threads conforming to the shape of thread desired to be cut, each of said threads being interrupted to form a number of cutting edges, the cutting edges so formed in each thread engaging different points in the threads being cut.

16. A screw thread milling cutter having on one of its surfaces threads conforming to the shape of thread to be cut, said threads having a lead which is a multiple of that desired to be cut, said cutter adapted to be rotated relative to the blank to be threaded at a speed the reciprocal of the multiple lead of the cutter threads, said cutter having its threaded surface divided into cutting edges by generally axial grooves, the number of cutting edges formed thereby being incommensurate with the multiple lead of the cutter threads.

17. A screw thread milling cutter having on one of its surfaces a thread conforming to the shape of thread to be cut, said thread having a lead which is a multiple of that desired to be cut, said cutter adapted to be rotated in an axis parallel to the axis of the blank relative to the blank to be threaded at a speed the reciprocal of the multiple lead of the cutter thread, said cutter having its threaded surface divided into cutting edges by generally axial grooves, the number of cutting edges formed thereby being incommensurate with the multiple lead of the cutter thread.

18. A screw thread milling cutter having on one of its surfaces multiple start threads conforming to the shape of thread to be cut, and adapted to be rotated relative to the blank to be threaded, said cutter having its threaded surface divided into cutting edges by generally axial grooves, the number of cutting edges formed thereby being incommensurate with the multiple of the cutter threads.

19. A screw thread milling cutter having on its periphery multiple start threads conforming to the shape and size to be cut, and adapted to be rotated relative to the blank to be threaded, said cutter having its threaded surface divided into cutting edges by generally axial grooves, the number of cutting edges being incommensurate with the multiple of the cutter threads.

20. A screw thread milling cutter having on one of its surfaces threads conforming to the shape of thread to be cut, said threads having a lead which is a multiple of that desired to be cut, said cutter adapted to be rotated relative to the blank to be threaded at a speed the reciprocal of the multiple lead of the cutter threads, said cutter having its threaded surface divided into cutting edges by generally axial grooves but at a small angle to the axis, the number of cutting edges formed thereby being incommensurate with the multiple lead of the cutter threads.

21. A screw thread milling cutter having on one of its surfaces a thread conforming to the shape of thread to be cut, said thread having a lead which is a multiple of that desired to be cut, said cutter adapted to be rotated in an axis parallel to the axis of the blank relative to the blank to be threaded at a speed the reciprocal of the multiple lead of the cutter thread, said cutter having its threaded surface divided into cutting edges by generally axial grooves but at a small angle to the axis, the number of cutting edges formed thereby being incommensurate with the multiple lead of the cutter thread.

22. A screw thread milling cutter having on one of its surfaces multiple start threads conforming to the shape of thread to be cut, and adapted to be rotated relative to the blank to be threaded, said cutter having its threaded surface divided into cutting edges by generally axial grooves but at a small angle to the axis, the number of cutting edges formed thereby being incommensurate with the multiple of the cutter threads.

23. A screw thread milling cutter having on its periphery multiple start threads conforming to the shape and size to be cut, and adapted to be rotated relative to the blank to be threaded, said cutter having its threaded surface divided into cutting edges by generally axial grooves but at a small angle to the axis, the number of cutting edges being incommensurate with the multiple of the cutter threads.

24. A screw thread milling cutter, said cutter being provided with screw threads having a lead which is a multiple of that desired to be cut, said cutter being rotated relative to the blank to be threaded at a speed the reciprocal of the multiple lead of the cutter threads, and said cutter having its threaded surface divided into cutting edges, the number of cutting edges being incommensurate with the multiple lead of the cutter threads.

25. A screw thread milling cutter having screw threads conforming to the cross section of thread desired to be cut, the lead of the threads on the cutter and that to be cut being in multiple relationship to the other, the threaded periphery of said cutter being gashed by a number of grooves incommensurate with the multiple lead of the threads on the cutter.

26. A screw thread milling cutter having screw threads conforming to the size and cross section of thread desired to be cut, the lead of the threads on the cutter and that to be cut being in multiple relationship to the other, the threaded periphery of said cutter being gashed to form a number of cutting teeth in said cutter incommensurate with the multiple lead of the threads on the cutter.

27. A screw thread milling cutter adapted to be rotatably mounted in an axis parallel with the blank to be threaded, said cutter having threads conforming to the shape to be cut and having a lead which is a multiple of that desired to be cut, said cutter being rotated at a speed relative to the blank which is a reciprocal of the multiple lead of the cutter threads, said cutter having its threaded surface divided into cutting edges by generally axial grooves, the cutting teeth being differently disposed in different arcs of the cutter.

28. In a screw cutting machine, a screw thread milling cutter, and means for rotating said cutter, said means being in engagement with said cutter when the cutter is in operative position and disengaged therefrom when the cutter is in inoperative position.

29. In a screw cutting machine, a screw thread milling cutter, means for rotating said cutter, means for feeding said cutter into operative position with a blank to be threaded, and means operating simultaneously with said feeding movement to engage said rotating means with said cutter when said cutter is in operative position.

30. In a screw cutting machine, a screw thread milling cutter, means for rotating said cutter, and means for feeding said cutter into operative position with a blank to be threaded, said rotating means being operatively connected with said milling cutter during the movement of the cutter into operative position, and disengaged from said cutter during the movement of the cutter out of engagement with the blank.

31. An automatic machine comprising in combination, means for rotating a blank, a thread milling cutter having a helix on one of its surfaces, means for rotating said cutter at a predetermined speed relative to said blank rotation, means for feeding said cutter toward said blank, and means permitting additional operations on the blank.

32. An automatic machine comprising in combination, means for rotating a blank, a thread milling cutter having a helix on one of its surfaces, means for rotating said cutter at a predetermined speed relative to said blank rotation, means for feeding said cutter toward said blank, and means permitting additional operations on the blank, including means for cutting off said blank.

33. An automatic machine comprising in combination, means for rotating a blank, a thread milling cutter having a helix on one of its surfaces, means for rotating said cutter at a predetermined speed relative to said blank rotation, means for feeding said cutter toward said blank, means permitting additional operations on said blank, means for cutting off said blank, and means permitting advancing a new blank into operative position.

34. An automatic machine comprising in combination, means for rotating a blank, a thread milling cutter having a helix on one of its surfaces, means for rotating said cutter at a predetermined speed relative to said blank rotation, means for feeding said cutter toward said blank, and means for cutting off said blank after the milling operation is completed.

35. An automatic machine comprising in combination, means for rotating a blank, means for rotating a thread milling cutter having a helix on one of its surfaces at a predetermined speed relative to said blank rotation, means for feeding said cutter toward said blank, and means for cutting off said blank operating in timed relation to said milling cutter.

36. An automatic machine comprising in combination, means for rotating a blank, a thread milling cutter having a helix on one of its surfaces, means for rotating said cutter at a predetermined speed relative to said blank rotation, means for automatically feeding said cutter toward said blank, and means for cutting off said blank after the milling operation is completed.

37. An automatic machine comprising in combination, means for rotating a blank, a thread milling cutter having a plurality of generally circumferential rows of cutting edges, said cutter being mounted on a cross slide of said machine, means for feeding said cutter toward said blank, and means for cutting off said blank mounted on a cross slide oppositely disposed to the slide on which said milling cutter is mounted.

38. An automatic machine comprising in combination, means for rotating a blank, a thread milling cutter having a plurality of generally circumferential rows of cutting edges, means for rotating said cutter, means for feeding said cutter toward said blank, and means permitting additional operations on the blank. including means for cutting off said blank, said means for cutting off said blank being mounted opposite to said milling cutter and operating in timed relation thereto.

39. An automatic machine comprising in combination, means for rotating a blank, a thread milling cutter having a plurality of generally circumferential rows of cutting edges, means for rotating said cutter, means for feeding said cutter toward said blank, means preventing axial movement of said cutter, and means permitting additional operations on the blank, including means for cutting off said blank.

40. An automatic machine comprising in combination, means for rotating a blank, a thread milling cutter having a plurality of generally circumferential rows of cutting edges, means for rotating said cutter, means for feeding said cutter toward said blank, means permitting additional operations on said blank, including means for cutting off said blank, means preventing axial movement of said cutter, and means permitting advancing a new blank into operative position.

41. An automatic machine comprising in combination, means for rotating a blank, a thread milling cutter having a plurality of generally circumferential rows of cutting edges, means for rotating said cutter, means for feeding said cutter toward said blank, and means for cutting off said blank, said last mentioned means operating in timed relation to said milling cutter.

42. An automatic machine comprising in combination, means for rotating a blank, a thread milling cutter having a plurality of generally circumferential rows of cutting edges, means for rotating said cutter, means for feeding said cutter toward said blank, means preventing axial movement of said cutter, and means for cutting off said blank after the milling operation is completed.

43. An automatic machine comprising in combination, means for rotating a blank, a thread milling cutter having a plurality of generally circumferential rows of cutting edges, means for rotating said cutter, means for automatically feeding said cutter toward said blank, and means for cutting off said blank, said last mentioned means operating in timed relation to said milling cutter.

44. An attachment for an automatic machine having a cross slide and a spindle comprising in combination, a body member adapted to be attached to the cross slide on said machine, a thread milling cutter mounted on said body member in an axis parallel to the spindle on said machine, and means to rotate said cutter in timed relation to said machine spindle when said cutter and body member are in operative position.

45. An attachment for an automatic machine comprising in combination, a body member adapted to be attached to a cross slide on said machine, a thread milling cutter mounted on said body member in operative position relative to the spindle of said machine, and means to rotate said cutter in timed relation to said machine spindle.

46. An attachment for a screw machine comprising in combination, a body member adapted to be attached to a movable part of said machine, a thread milling cutter mounted on said body member in operative relation to a spindle on said machine, and means to rotate said cutter in timed relation to said machine spindle.

47. An attachment for a screw machine comprising in combination, a body member adapted to be attached to a movable part of said machine, a thread milling cutter mounted on said body member in operative relation to a spindle on said machine, means to prevent axial movement of said cutter, and means to rotate said cutter in timed relation to said machine spindle.

48. For use in milling screw-threads, a multiple thread hob having equally spaced transverse chases whereof the total number, plus or minus one, is divisible by the number of threads constituting the multiple thread employed.

49. For use in milling screw-threads, a four-threaded hob having equally spaced transverse chases whereof the total number, plus or minus one, is divisible by four.

In testimony whereof, I hereto affix my signature.

C. H. TAYLOR.